Patented Aug. 20, 1929.

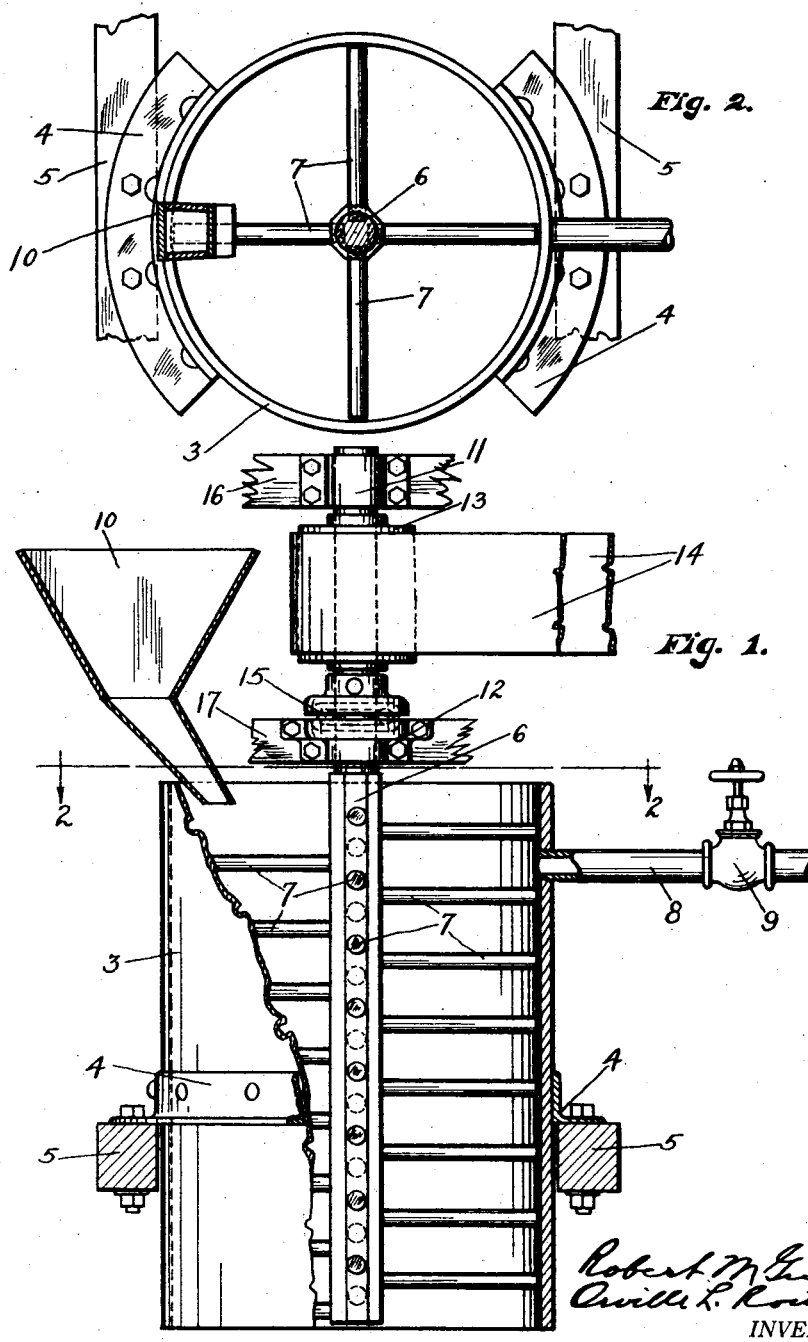

1,725,186

UNITED STATES PATENT OFFICE.

ROBERT M. GREENLEAF AND ORVILLE L. ROUTT, OF LOS ANGELES, CALIFORNIA, ASSIGNORS TO PLASTOID PRODUCTS, INC., OF LOS ANGELES, CALIFORNIA, A CORPORATION.

HIGH-SPEED MIXER.

Application filed February 7, 1927. Serial No. 166,413.

Our invention relates to high speed mixers, and more particularly to a mixing apparatus designed for mixing various plastic materials adapted to harden, such as is used in manufacturing wall board, plaster lath, and the like. In most apparatus of this character it has been the theory that all parts of the mixer must be wiped in order to keep them clean. We have discovered, however, after much study and experimental effort that this can be avoided, and we have conceived of a simple, practical and economical way of doing it and present it as the subject matter of this application. We have discovered that by providing a cylindrical body into which the materials are fed and having a high speed mixer therein, said materials are thoroughly mixed as they move by gravity down through said cylinder and that any degree of moisture can be secured and the mixed product discharged through the lower end of the cylinder ready for use. The centrifugal force throws the materials against the inside wall of the cylindrical body and away from the mixer, thus keeping the mixer clean and preventing the materials from setting or hardening on the mixer and the ends of the mixer arms keep it from sticking to and hardening on the inside wall of the cylinder. It will be understood, of course, that the materials set or harden quickly and for this reason it has been necessary under a slow operation to provide means for wiping the mixer elements as well as the container in which the materials are mixed, but with our new and continuous, high speed mixing method, we have greatly cheapened the mixing operation, reduced the labor in connection therewith, and at the same time produce a better and more uniform mixture.

In order to fully explain our invention, we have illustrated a simple embodiment thereof on the accompanying sheet of drawings, which we will now explain.

Figure 1 is a side elevation of an apparatus embodying our invention, with parts broken out and shown in section; and Figure 2 is a horizontal sectional view taken on line 2—2 of Fig. 1.

Referring now more in detail to the drawings, our invention as here embodied for illustrative purposes, includes a cylindrical body, 3, open at both ends, and suitably supported, as by means of segmental brackets, 4, 4, and beams 5, 5, wherby to be held firmly. Any suitable supporting means can be used. The mixer comprises in the present showing an octagon shaft 6, provided with a series of arms or rods, 7, 7, in staggered positions so that their outer ends will in effect move over the entire inside area of said cylinder and thus wipe any of the materials which might adhere thereto from said cylinder and keep it moving by gravity downwardly toward the open end of said cylinder. A water supply pipe, 8, with valve, 9, is connected with one side of said cylinder, for supplying water in any desired quantity and with any desired force into said cylinder. A hopper, 10, is shown for feeding the dry material, whatever it may be, as gypsum, into said cylinder. The mixer is suitably suspended down in said cylinder, 3, from two bearings, 11 and 12, with a driving pulley, 13, on said shaft and by means of which said mixer is driven by a belt, 14, from any suitable source of power. A ball-bearing support, as at 15, is provided for said mixer. Said bearings, 11 and 12, can be secured to suitable beams, as 16, 17, according to the requirements.

Thus we have provided a very simple, economical and practical mixer for mixing, under a high speed operation, materials which quickly set or harden when mixed with water, and while we have shown but one embodiment of the invention for descriptive purposes, we are aware that changes in details can be made without departing from the spirit of the invention, and we do not, therefor, limit the invention to the showing made for this purpose, except as we may be limited by the hereto appended claims.

We claim:

1. A material mixer including in combination a vertical body open at both ends, a shaft extending down into said body and having suspending bearings at its upper end, means for driving said shaft at high speed to throw material therefrom, a series of arms extending from said shaft outwardly and revolving in contiguous paths one above the other and with their outer ends in proximity to the inside of said body wall, whereby the ends of said arms will wipe matter from said wall, means for feeding materials to be mixed into the upper end of said body to fall by gravity therethrough among said revolving arms, said arms being adapted to throw the materials therefrom and to wipe it from the inside of said body, whereby to keep it moving to the open lower end of said body.

2. A material mixer of the character referred to including a cylindrical body, vertically supported with both ends open, a shaft revolubly suspended down into said body with its lower end free of supports, a series of arms projecting lateraly from the opposite sides of said shaft to within proximity of the inside wall of said body and adapted to wipe material therefrom, said arms being spaced and staggered to wipe the entire mixing surface of said wall to prevent any accumulation of materials thereon, means for driving said shaft and arms at high speed, and means for discharging water and material to be mixed into the upper part of said body to move continuously by gravity therethrough.

Signed at Los Angeles, Los Angeles County, California, this 28th day of January, 1927.

ROBERT M. GREENLEAF.
ORVILLE L. ROUTT.